United States Patent [19]

Jiang

[11] Patent Number: 4,819,694

[45] Date of Patent: Apr. 11, 1989

[54] WATER CONTROL VALVE

[75] Inventor: Ying Z. Jiang, Beijing, China

[73] Assignee: Ling Nan Flexible & Shaft Factory of Guang zhou, Guangzhou, China

[21] Appl. No.: 98,812

[22] Filed: Sep. 21, 1987

[51] Int. Cl.⁴ .......................................... F16K 11/087
[52] U.S. Cl. .............................. 137/625.47; 137/636.3; 137/597
[58] Field of Search .............. 137/625.47, 597, 625.41, 137/636.3

[56] References Cited

U.S. PATENT DOCUMENTS

| | | | |
|---|---|---|---|
| 3,056,418 | 10/1962 | Adams et al. | 137/625.41 X |
| 3,823,742 | 7/1974 | Von Corpon | 137/597 X |
| 4,108,207 | 8/1978 | Doody | 137/625.47 |
| 4,562,864 | 1/1986 | Yang | 137/597 |

*Primary Examiner*—Arnold Rosenthal

*Attorney, Agent, or Firm*—Pennie & Edmonds

[57] ABSTRACT

An improved flow control valve for controlling selection of the temperature of water and its direction to one of several outlet ports, for example, a shower head or a tub spigot, is disclosed. The valve comprises a ball member having first and second inlet passages and one outlet passage formed in it, which fits within a valve body having first and second inlet ports and first and second outlet ports therein. The inlet passages in the ball are disposed in the same plane as the inlet ports, while the outlet passage is disposed in the same plane as are the outlet ports. These planes may be perpendicular to one another. A control member is connected to the ball and is rotatable about a first axis to select the temperature of the water and about a second axis to control the amount of water flowing and its direction to one of the outlet ports.

10 Claims, 2 Drawing Sheets 4,819,694

WATER CONTROL VALVE

FIELD OF THE INVENTION

This invention relates to an improved valve for the control of flow of water. More particularly, this invention relates to a single valve which permits a bather to select any desired water temperature between fully hot and fully cold, and to direct flow of the water to one of plural outlets, for example, either to a bath tub spigot or a shower head.

BACKGROUND OF THE INVENTION

Valves employing a single control device for selection of a desired water temperature between hot and cold are known. Such valves also typically comprise integral means for controlling rate of water flow. However, so far as known to the present inventor, no known water control valve also includes a valve for control of the output path of the water. More particularly, so far as known to the present inventor, no single valve is known which permits selection of the temperature of water and also allows a bather to direct the water between plural output devices, e.g., to choose whether the water goes from the valve to a shower head or a bath tub spigot. Accordingly, it has typically been necessary to combine the known valve for selection of the water temperature with a second valve for control of its flow, that is, a second valve for determining whether the water goes to a shower head or a tub spigot.

SUMMARY OF THE INVENTION

Accordingly, it is an object of the invention to provide an improved valve for the control of flow of water in which a single valve member controls the selection of the water temperature and whether it is to be directed to a shower head or a tub spigot or the like.

This and other objects of the invention, as will become apparent from the following, are met by the present invention, according to which a generally spheroidal valve ball is received within a spheroidal cavity in a valve body. The valve body has first and second inlet ports for hot and cold water and one or more outlet ports for connection to a shower head and a tub spigot or the like. A control member extends out of the valve body to be contacted by a bather, and is attached to the ball for control of its motion. Plural passages for the connection of the inlet ports to one of the outlet ports are formed in the valve ball. More specifically, two inlet passages which meet at the center of the ball are provided in a first plane also including the two inlet ports, allowing selection of the water temperature, while a third outlet passage joining the inlet passages at the center of the ball can be aligned with one of the outlet ports. The control member is rotated about a first axis to select the temperature of the water, and pivots about another axis to direct the flow of water to one of the outlet ports, and to control the amount of water flow.

BRIEF DESCRIPTION OF THE DRAWINGS

The invention will be better understood if reference is made to the accompanying drawings, in which.

DESCRIPTION OF THE PREFERRED EMBODIMENT

Figure 1:
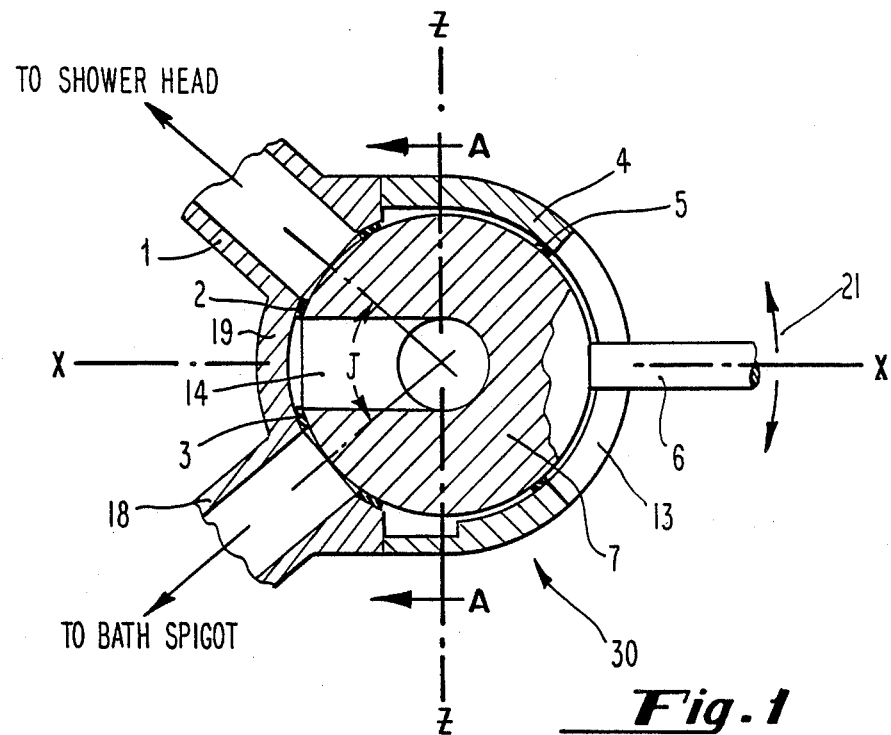
FIG. 1 shows a cross-sectional view of the valve according to the invention.
Figure 2:
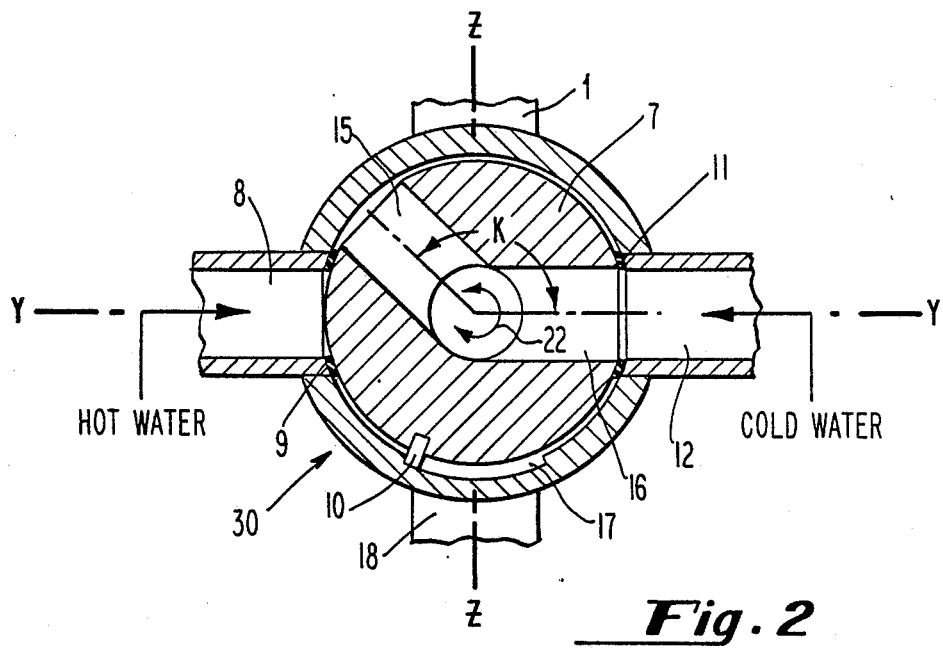
FIG. 2 shows a cross-section taken along the line A—A of FIG. 1.
Figure 3:
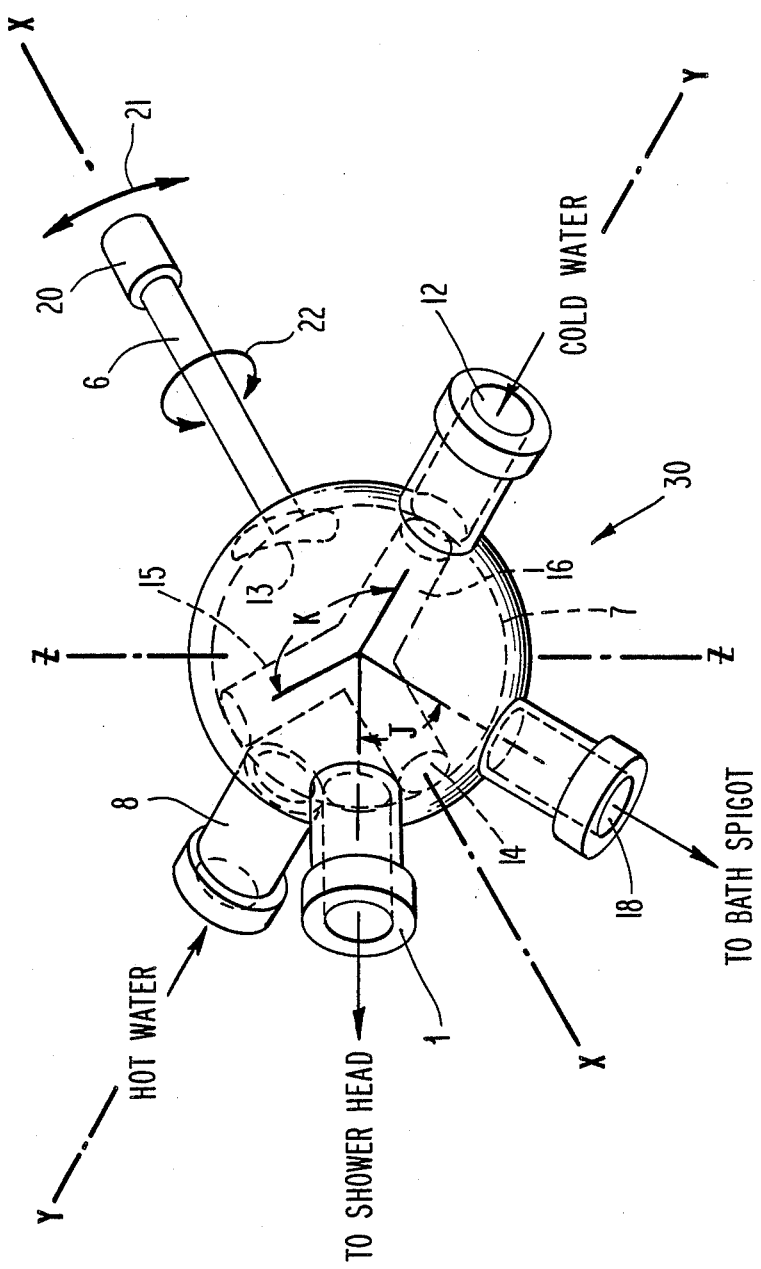
FIG. 3 shows a three-dimensional perspective view of the valve of the invention.

As mentioned, FIGS. 1 and 2 are cross-sectional views of the valve 30 of the invention while FIG. 3 is a three dimensional perspective view. In each of the views, the Cartesian axes have been added for clarity. Thus, FIG. 1 is a cross section in the x-z plane as identified on FIG. 3. Similarly, FIG. 2 is a section in the y-z plane as shown on FIG. 3. It will be recognized, of course, that these axes are adopted for convenience and clarity in explanation of the principles of the present invention, and are not intended to limit the same. In particular, no implication should be drawn that the particular disposition shown of the various elements of the valve of the invention, e.g. in planes orthogonal to one another, is meant to so limit the invention, except as specifically claimed.

Thus, FIG. 1 shows a generally spheroidal valve ball 7 disposed in a cavity in a valve body, made up of a front portion 4 and a rear portion 19. First and second outlet ports 1 and 18 are formed in the rear valve body portion 19. As indicated, the first outlet port 1 may be connected to a shower head while the second outlet port 18 may be connected to the spigot of a bath tub. A control member 6 is affixed to the valve ball 7 and can be rotated as indicated by the arrow 21 to connect an outlet passage 14 formed in the valve ball 7 with one or the other of the outlet passages 1 and 18. As indicated, the outlet passage 14 can only be connected to one of the outlet passages 1 and 18 at any given time, while disposing it in the position shown in FIG. 1 effectively shuts off water flow completely. If the outlet passage 14 is partially aligned with one of the outlet ports 1 and 18, water flow will be accordingly limited.

To enable the ball 7 to be rotated about the y-y axis, that is, clockwise or counterclockwise in FIG. 1, as indicated by the arrow 21, a slot 13 is formed in the front valve body member 4. The length of the slot 13 defines the amount of rotation permitted to the ball 7; its rotation is limited when the control member 6 abuts either end of the slot 13.

Seals 5, 2, and 3 may be disposed about the slot 13 and the outlet ports 1 and 18, respectively, to seal water within the valve 30 according to the invention.

FIG. 2 shows the connection of the valve ball 7 to inlet ports 8 and 12 formed in the valve body. The first inlet port 8 may be connected to a source of hot water and the second port 12 to a source of cold water, as indicated, but these connections are not to be considered a limitation on the invention. First and second inlet passages 15 and 16 are formed in the valve ball 7. In the position shown in FIG. 2, inlet passage 16 is connected to cold water inlet 12 while inlet passage 15 is out of registration with hot water inlet port 8, such that only cold water is delivered to the outlet port selected. By rotation of the valve ball 7 about the x-x axis, that is, counterclockwise in FIG. 2, the temperature of the water may be adjusted from the full-cold position shown to a full-hot position in which inlet passage 15 is lined up with inlet port 8 and inlet passage 16 is completely out of registration with inlet port 12, or to any desired position in between.

The degree of rotation of the ball about the x-x axis is limited by a stop member 10 fitting within a recess 17 formed in the valve body (FIG. 2). Note that recess 17 is not an elongated slot but is essentially rectangular in outline, to permit rotation of the ball about the x-x axis, again to adjust the temperature of the water, as well as about the y-y axis, to permit selection of the outlet port to which the outlet passage 14 is to be connected.

In order to explain the terminology used in the claims which follow with clarity and precision, the following preferred geometrical relationships are set forth. In the preferred embodiment of the invention shown in FIG. 3, the inlet ports 8 and 12 are aligned with one another, that is, make an angle of 180° with respect to one another. The inlet passages 15 and 16 in the valve body form an angle K to one another, which is less than the angle formed between the inlet ports 8 and 12. However, the inlet ports 8 and 12 and the inlet passages 15 and 16 all lie in a single first plane, the y-z plane in FIG. 3. The outlet ports 1 and 18 and outlet passage 14 are also located in a plane, which in the preferred embodiment is the x-z plane. Ports 1 and 18 form an angle J to one another. In the preferred embodiment shown, the plane in which the outlet ports 1 and 18 and outlet passage 14 all lie is perpendicular to the plane in which the inlet passages 15 and 16 and inlet ports 8 and 12 lie. However, this is not essential to the practice of the invention, but is adopted simply for reasons of manufacturing convenience and simplicity.

As can be appreciated from FIG. 3, the control member 6, which may have a control handle 20 mounted thereon for the user's convenience, is rotated about first and second axes to affect adjustment of the water temperature and to direct it to the appropriate outlet passage. Specifically, rotation of the control member 6 about the x-x axis, as indicated by arrow 22, is used to select the temperature of the water, while rotation about the y-y axis, according to arrow 21, is used to control the amount of water flowing and to select the outlet port to which the outlet passage 14 is connected.

While reference has been made in the foregoing to the various ports and passages and their relative alignment with respect to one another and to various planes, it should be understood that such statements refer more accurately to the centerlines of the ports and passages, which are more exactly defined. Thus, for example, it is the centerlines of the inlet passages 15 and 16 and the outlet passage 14 which intersect at or near the center of the ball 7, and it is the centerlines of the inlet passages 15 and 16 and of the inlet ports 8 and 12 which lie in the y-z plane, as shown in FIG. 2. Similarly the centerlines of the outlet ports 1 and 18 as well as that of the outlet passage 14 lie in the x-z plane, as shown in FIG. 1.

It will be appreciated that while a preferred embodiment of the invention has been described in detail, this is merely exemplary of the invention and should not be considered a limitation on its scope, which is properly defined only by the following claims.

I claim:

1. A valve for controlling flow of water between hot and cold water supply pipes and first and second outlet pipes, comprising;
    a valve body having a generally spheroidal cavity therein, having inlet ports for connection to said hot and cold water supply pipes and outlet ports for connection to said first and second outlet pipes further formed therein, the centerlines of said inlet ports being disposed at a first angle to one another, the centerlines of said outlet ports being disposed at a second angle to one another in a first plane, and said first plane making a third angle with respect to a second plane containing the centerlines of said inlet ports;
    a spheroidal valve ball, said ball fitting within said cavity in said valve body and having first and second inlet passages formed therein, the centerlines of said inlet passages formed being in a plane including the centerlines of said inlet ports in said valve body, and at a fourth angle to one another different from the first angle between said inlet ports in said valve body, and joining one another substantially at a point located at the center of said ball, said ball further having an outlet passage formed therein, the centerline of said outlet passage lying in the first plane including the center lines of the outlet ports in said valve body, meeting those of said inlet passages at their junction, and extending therefrom to the surface of said ball; and
    a control member connected to said ball and adapted to rotate said ball about first and second axes, whereby said inlet passages in said ball are controllably registrable with said inlet ports in said valve body, and said outlet passage in said ball is controllably registrable with said outlet ports in said valve body; and
    wherein said outlet ports in said valve body are of equal or greater area than the outlet passage in said ball.

2. The valve of claim 1, wherein said second plane including the centerlines of said inlet ports is substantially perpendicular to the first plane including the centerlines of said outlet ports.

3. The valve of claim 1, wherein said control member is elongated, is physically connected to said ball, and is adapted to pivot said ball about a first axis substantially perpendicular to said second plane to control registration of said inlet passages with said inlet ports and about a second axis substantially perpendicular to said first plane to control registration of said outlet passage with said outlet ports.

4. The valve of claim 3, wherein said valve body has formed in it a slot through which said control member extends, whereby said ball may be pivoted about said second axis by moving said control member along said slot, and may be pivoted about said first axis by rotation of said control member about its own axis.

5. The valve of claim 4, wherein the ends of said slot limit the range of rotation of said control member and of said ball about said second axis.

6. The valve of claim 4, further comprising stop means for limiting the degree of rotation permitted said ball about said first axis.

7. The valve of claim 6, wherein said stop means comprises a pin carried by one of said ball and said valve body received in a recess in the other of said ball and said valve body.

8. The valve of claim 1 wherein the angle between said inlet passages is related to the angle between said inlet ports such that said inlet passages may communicate with either or both or neither of said inlet ports at any given time, dependent on the relative alignment of said ball and said body.

9. The valve of claim 1, wherein said outlet passage is located with respect to said outlet ports such that it can communicate with only one or neither of said outlet ports at any given time.

10. The valve of claim 1 further comprising seal means extending around said inlet and outlet ports in said valve body.

* * * * *